US010931699B2

(12) United States Patent
Wolff et al.

(10) Patent No.: US 10,931,699 B2
(45) Date of Patent: Feb. 23, 2021

(54) SYSTEMS AND METHODS FOR DETECTING SECURITY INCIDENTS ACROSS CLOUD-BASED APPLICATION SERVICES

(71) Applicant: Obsidian Security, Inc., Newport Beach, CA (US)

(72) Inventors: Matt Wolff, Newport Beach, CA (US); Alexander Vandenberg-Rodes, Costa Mesa, CA (US); Naresh Chebolu, Irvine, CA (US); Marcus Mccurdy, Haddon Township, NJ (US); Matthew Maisel, Philadelphia, PA (US); Jody Forness, Laguna Beach, CA (US); Jedidiah Mitten, Lakeside, CA (US); Noah Corradin, Corona Del Mar, CA (US); Samantha Staszak, Costa Mesa, CA (US); David Newhall, Tustin, CA (US); Christopher Galbraith, Irvine, CA (US); Christopher Fuller, Stonehouse (GB); Brian Lau, Huntington Beach, CA (US); Benjamin Johnson, Newport Beach, CA (US)

(73) Assignee: Obsidian Security, Inc., Newport Beach, CA (US)

( * ) Notice: Subject to any disclaimer, the term of this patent is extended or adjusted under 35 U.S.C. 154(b) by 0 days.

(21) Appl. No.: 16/788,615

(22) Filed: Feb. 12, 2020

(65) Prior Publication Data
US 2020/0259852 A1    Aug. 13, 2020

Related U.S. Application Data

(60) Provisional application No. 62/804,956, filed on Feb. 13, 2019.

(51) Int. Cl.
G06F 21/56    (2013.01)
H04L 29/06    (2006.01)
(Continued)

(52) U.S. Cl.
CPC ........ H04L 63/1425 (2013.01); G06F 21/316 (2013.01); G06F 21/566 (2013.01);
(Continued)

(58) Field of Classification Search
CPC ....... G06F 21/316; G06F 21/566; H04L 63/14
See application file for complete search history.

(56) References Cited

U.S. PATENT DOCUMENTS 8,554,703 B1    10/2013 Lin et al.
9,306,965 B1 *   4/2016 Grossman ........... H04L 63/1425
(Continued)

OTHER PUBLICATIONS

International Search Report and Written Opinion for International Application No. PCT/US2020/017901, dated Jul. 15, 2020 (14 pages).

*Primary Examiner* — Thaddeus J Plecha
(74) *Attorney, Agent, or Firm* — Goodwin Procter LLP (57) ABSTRACT

A method, a system, and an article are provided for identification of security-related activities based on usage of a plurality of independent cloud-based, hosted application platforms. An example method includes: receiving, from the application platforms, activity data and state data for a plurality of users of the application platforms; generating one or more predictive models configured to detect deviations from normal user behavior across the application platforms; providing, as input to the one or more predictive models, the activity data and the state data for at least one of the users; receiving, from the one or more predictive models, an indication that an activity of the at least one of the users deviates from the normal user behavior; and facilitating a remedial action to address the indicated deviation.

23 Claims, 4 Drawing Sheets

(51) Int. Cl.
  *G06N 7/00* (2006.01)
  *H04L 29/08* (2006.01)
  *G06F 21/31* (2013.01)

(52) U.S. Cl.
  CPC ............ *G06N 7/005* (2013.01); *H04L 63/14* (2013.01); *H04L 63/1441* (2013.01); *H04L 67/22* (2013.01)

(56) References Cited

U.S. PATENT DOCUMENTS

| | | |
|---|---|---|
| 9,537,880 B1* | 1/2017 | Jones ................... H04L 63/1433 |
| 2015/0172321 A1 | 6/2015 | Kirti et al. |
| 2015/0319185 A1 | 11/2015 | Kirti et al. |
| 2018/0234443 A1* | 8/2018 | Wolkov ................ G06K 9/6284 |
| 2018/0316704 A1* | 11/2018 | Joseph Durairaj .......................... H04L 63/1425 |
| 2019/0028557 A1* | 1/2019 | Modi ....................... H04L 43/04 |
| 2019/0068627 A1* | 2/2019 | Thampy ................. H04W 12/12 |
| 2019/0238574 A1* | 8/2019 | Iliofotou ............. H04L 63/1425 |
| 2020/0213338 A1* | 7/2020 | Lotem ..................... G06N 20/00 |
| 2020/0236112 A1* | 7/2020 | Pularikkal ............. H04L 63/104 |

* cited by examiner

SYSTEMS AND METHODS FOR DETECTING SECURITY INCIDENTS ACROSS CLOUD-BASED APPLICATION SERVICES

CROSS-REFERENCE TO RELATED APPLICATIONS

This application claims the benefit of U.S. Provisional Patent Application No. 62/804,956, filed Feb. 13, 2019, the entire contents of which are incorporated by reference herein.

TECHNICAL FIELD

The following disclosure is directed to methods and systems for monitoring the use of software systems, and, more specifically, methods and systems for organizing and identifying potentially threatening activities across multiple third party cloud-based application platforms.

BACKGROUND

The terms "cloud" and "cloud computing" are often used to represent a specific architectural and delivery method for computer applications and services that are hosted and accessed via the Internet, often by a service provider that offers subscriptions to these applications and services —in some instances for free and others for a fee. Various cloud-based service models include infrastructure as a service (IaaS), platform as a service (PaaS), software as a service (SaaS), and network as a service (NaaS). "Cloud storage" can also refer to a remotely hosted data store and client application of a single service provider. Corporate cloud applications are typically accessed via a user device via a corporate intranet and the public Internet to the remote services in order to provide the cloud-based services. These services can utilize new functionality (e.g., synchronized file sharing services such as BOX.COM and DROPBOX) as well as replacements for traditional services such as email and desktop applications (e.g., G-SUITE, OFFICE 365, etc.). Still other cloud providers include SALESFORCE.COM, AMAZON WEB SERVICES, and others.

SUMMARY

Embodiments of the disclosed invention provide systems and methods for contextual and cross-application activity attribution, state assessment, entity resolution, and threat detection based in part on data retrieved to and from, as well as activity on, various application platforms, such as cloud-based, third party hosted application platforms. In one embodiment, a method for representing common entities and actions across heterogeneous datasets from cloud-based application platforms includes extracting user and event data from transaction logs, databases, and/or exposed web services and resolving entities and events from heterogeneous platforms into a common entity and/or a common action or event. In some instances, data from other sources (e.g., IP address data, geolocation data, VPN data, and others) may be used to enrich the corpus of information used to create unified definitions. The data can be analyzed to identify common "entities" (e.g., users or people) or activities (e.g., data or file manipulations or transmissions) throughout the different logs and databases that may be described using different terminology or captured at a different level of hierarchy across the various platforms. A graph can be constructed in which each identified "user" (as resolved across the various platforms) is assigned to a node, and activities and interactions among the users and/or other entities (e.g., data or files) are modeled as edges connecting the nodes. Using the graph, various security detection use cases can be implemented, such as unauthorized account takeover, insider threats, attack incidents, anomaly detection, and others. As a result, an organization can increase the efficiency with which it detects and responds to various incidents, and also minimize or optimize its "attack surface area," to make the organization less vulnerable to security incidents.

In one aspect, the subject matter described in this specification relates to a method (e.g., a computer-implemented method). The method includes: receiving, from a plurality of independent cloud-based, hosted application platforms, activity data and state data for a plurality of users of the application platforms, the activity data being indicative of user activities within the application platforms and the state data being indicative of a status of the users within the application platforms; generating, based on the activity data and the state data, one or more predictive models configured to detect deviations from normal user behavior across the application platforms; providing, as input to the one or more predictive models, the activity data and the state data for at least one of the users; receiving, as output from the one or more predictive models, an indication that an activity of the at least one of the users deviates from the normal user behavior; and facilitating a remedial action to address the indicated deviation.

In certain examples, the status of the users can include a user role, a user permission, and/or a user privilege. Generating one or more predictive models can include: constructing a graphical representation of the activity data and the state data, wherein each node of the graphical representation represents a respective user of the application platforms and each edge connecting the nodes represents an activity among the users and/or entities in the application platforms. The deviation from the normal user behavior can include an abnormal number of login attempts and/or can be indicative of account takeover. The deviation from the normal user behavior can be indicative of anomalous reconnaissance activity. The deviation from the normal user behavior can be or include behavior that is abnormal compared to behavior of other users who have similar roles within an organization that uses the application platforms.

In some instances, the method includes receiving, as output from the one or more predictive models, an indication that a privilege of the at least one of the users to access the application platforms deviates from a desired privilege. The method can include receiving, as output from the one or more predictive models, an indication that a data outflow from one of the application platforms is unauthorized. The method can include receiving, as output from the one or more predictive models, a risk score for each user from the plurality of users, wherein the risk score is or includes an indication of a likelihood that the user will engage in unauthorized activity using the application platforms. The method can include receiving, as output from the one or more predictive models, an indication that a user is attempting to transmit a sensitive item of data to a computer outside of an organization using the application platforms. The method can include mapping each user from the plurality of users to a respective user identifier for each application platform.

In another aspect, the subject matter described in this specification relates to a system having one or more computer processors programmed to perform operations including: receiving, from a plurality of independent cloud-based, hosted application platforms, activity data and state data for a plurality of users of the application platforms, the activity data being indicative of user activities within the application platforms and the state data being indicative of a status of the users within the application platforms; generating, based on the activity data and the state data, one or more predictive models configured to detect deviations from normal user behavior across the application platforms; providing, as input to the one or more predictive models, the activity data and the state data for at least one of the users; receiving, as output from the one or more predictive models, an indication that an activity of the at least one of the users deviates from the normal user behavior; and facilitating a remedial action to address the indicated deviation.

In various examples, the status of the users can include a user role, a user permission, and/or a user privilege. Generating one or more predictive models can include: constructing a graphical representation of the activity data and the state data, wherein each node of the graphical representation represents a respective user of the application platforms and each edge connecting the nodes represents an activity among the users and/or entities in the application platforms. The deviation from the normal user behavior can include an abnormal number of login attempts and/or can be indicative of account takeover. The deviation from the normal user behavior can be indicative of anomalous reconnaissance activity. The deviation from the normal user behavior can be or include behavior that is abnormal compared to behavior of other users who have similar roles within an organization that uses the application platforms.

In some implementations, the operations includes receiving, as output from the one or more predictive models, an indication that a privilege of the at least one of the users to access the application platforms deviates from a desired privilege. The operations can include receiving, as output from the one or more predictive models, an indication that a data outflow from one of the application platforms is unauthorized. The operations can include receiving, as output from the one or more predictive models, a risk score for each user from the plurality of users, wherein the risk score is or includes an indication of a likelihood that the user will engage in unauthorized activity using the application platforms. The operations can include receiving, as output from the one or more predictive models, an indication that a user is attempting to transmit a sensitive item of data to a computer outside of an organization using the application platforms. The operations can include mapping each user from the plurality of users to a respective user identifier for each application platform.

In another aspect, the subject matter described in this specification relates to an article. The article includes a non-transitory computer-readable medium having instructions stored thereon that, when executed by one or more computer processors, cause the one or more computer processors to perform operations including: receiving, from a plurality of independent cloud-based, hosted application platforms, activity data and state data for a plurality of users of the application platforms, the activity data being indicative of user activities within the application platforms and the state data being indicative of a status of the users within the application platforms; generating, based on the activity data and the state data, one or more predictive models configured to detect deviations from normal user behavior across the application platforms; providing, as input to the one or more predictive models, the activity data and the state data for at least one of the users; receiving, as output from the one or more predictive models, an indication that an activity of the at least one of the users deviates from the normal user behavior; and facilitating a remedial action to address the indicated deviation.

In another aspect, a computer-implemented method for identification of security related activities based on usage of a plurality of independent cloud-based, hosted application platforms includes: receiving, from multiple independent, cloud-based, hosted application platforms, activity data and/or state data representing events on a computer network. The activity data is indicative of events occurring among entities within the cloud-based hosted application platforms and the state data is indicative of a status of the entities related to the cloud-based, hosted application platforms. An abstracted, platform-agnostic dictionary of common entity terms is provided and the activity data and/or the state data is resolved using the dictionary such that each entity identified in the activity data and/or the state data from each of the cloud-based, hosted application platforms maps to one of the common entity terms. For example, the dictionary can be used to map a user to a respective user identifier for each application platform. A graphical representation of the activity and/or state data is constructed such that each node of the graphical representation represents a user of the cloud-based hosted application platforms and each edge connecting the nodes represents one of the events occurring among the users or other entities, wherein the characterization of the users and events is based on the common entity terms, and a baseline activity profile is created for one or more entities. Anomalous activities are identified based on a comparison of the entities' baseline activity profile and the graphical representation.

In another aspect, a system is provided for identification of security related activities based on usage of a plurality of independent cloud-based, hosted application platforms. The system includes one or more computer systems programmed to perform operations that include: receiving activity data and/or state data representing a plurality of events on a computer network from multiple independent cloud-based, hosted application platforms, where the activity data represents events occurring among entities within the cloud-based hosted application platforms and the state data represents a status of the entities related to the cloud-based, hosted application platforms. The computer systems are also programmed to perform operations including providing an abstracted, platform-agnostic dictionary of common entity terms and resolving the activity data and/or state data such that each entity identified in the activity data and/or the state data from each of the cloud-based, hosted application platforms maps to one of the common entity terms. The computer systems are also programmed to perform operations including: constructing a graphical representation of the activity and/or the state data such that each node of the graphical representation represents the entities' use of the cloud-based hosted application platforms and each edge connecting the nodes represents one of the events occurring among users and/or other entities, wherein the characterization of the entities and events is based on the common entity terms, constructing, for at least one of the entities, a baseline activity profile, and identifying anomalous activities based at least in part on a comparison of the entities' baseline activity profile and the graphical representation.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims.

DETAILED DESCRIPTION

Systems and methods for cloud activity monitoring and security policy implementation and control are illustrated. Organizations (e.g., companies, healthcare facilities, government agencies, schools, groups of users, etc.) include members (individual people, or, in some cases, roles that may be fulfilled by one or more individuals) that operate as users of cloud services offered to the organizations by cloud service providers. Each user typically has an individual account with each cloud service provider that is associated with the organization (e.g., a "work" account) as well as accounts that may not be associated with the organization (e.g., a "personal" account). In addition, the organization may have one or more enterprise-level accounts with the cloud providers that encompass or aggregate a number of individual user accounts, or function as role-based accounts.

Figure 1:
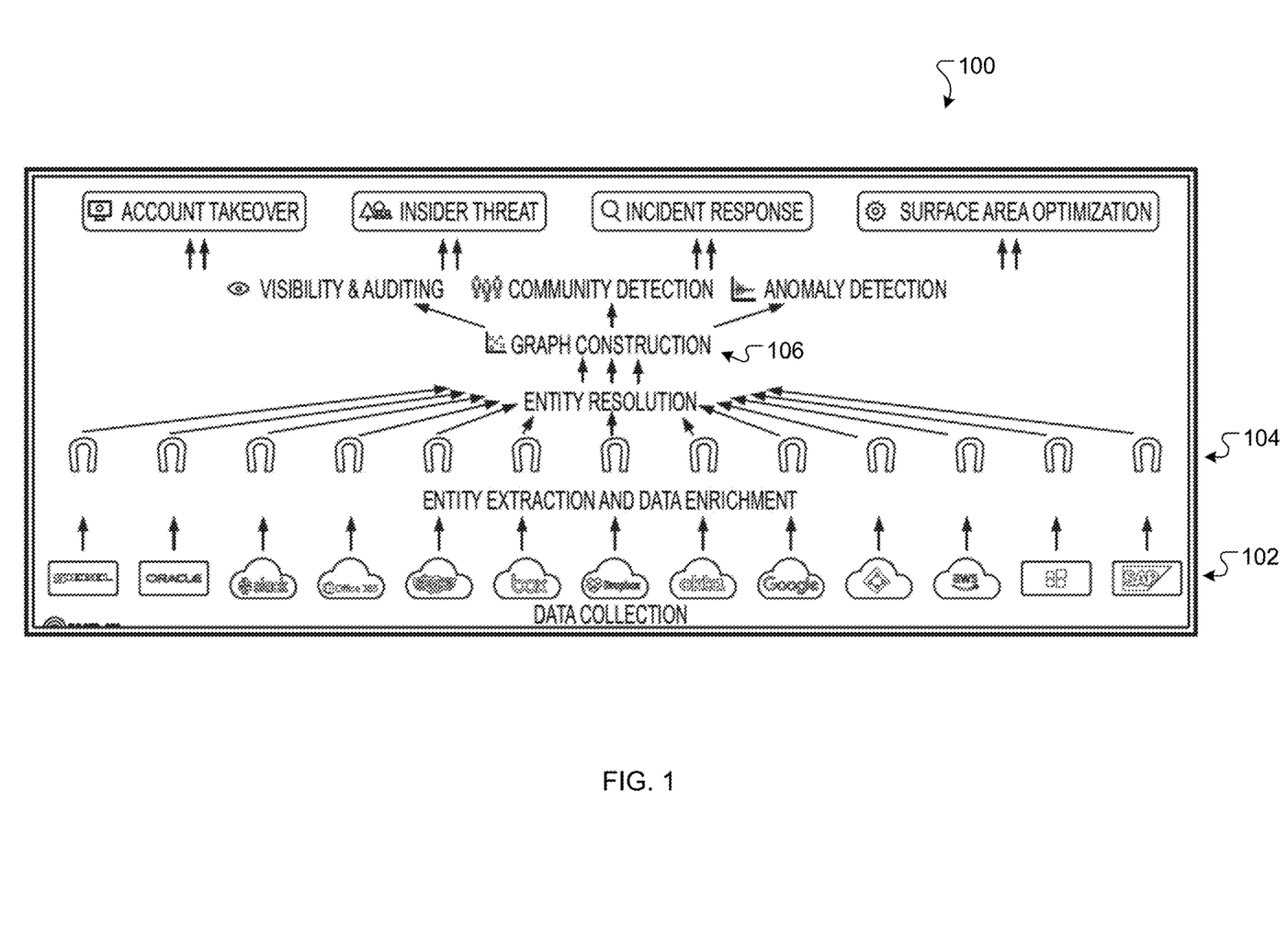
FIG. 1 is a schematic diagram of an example system for identifying and managing security-related activities associated with a plurality of independent cloud-based, hosted application platforms.

FIG. 1 illustrates an example system 100 in which an organization uses a number of cloud service providers 102. The cloud service providers 102 can host application platforms that members of the organization can access to accomplish various computational tasks related to, for example, word processing, social networking, data storage and access, computer programming, email, or other computer-related tasks. The organization can extract or obtain data 104 from the cloud service providers 102. The data 104 can be or include, for example, activity data and state data, as described herein. The extracted data 104 can be processed to resolve entities described in the data 104 to common entities. For example, each user can be mapped to a user identifier for each of the cloud application platforms. Additionally or alternatively, activities (e.g., deleting, sending, or receiving), data item types (e.g., text files, images, videos), or other entities or items can be mapped to corresponding terms or codes used by each application platform, as described herein. Next, the activity data and/or state data can be analyzed to detect deviations in expected or normal behavior (e.g., user activities) or conditions (e.g., user privileges or permissions) associated with the application platforms. For example, a graph 106 can be generated that illustrates the activities of each user and/or connections among users and/or other entities. Additionally or alternatively, one or more predictive models (e.g., a classifier) can be generated and used to detect anomalies. For example, activity data and/or state data for a user can be provided as input to a predictive model. The predictive model can provide output indicating that an activity or a condition associated with the user is anomalous, for example, when compared with activities or conditions for other users (e.g., who have similar roles or responsibilities in the organization). The model predictions can be used to flag risky user activities and/or privileges, and/or can be used to address harmful or unauthorized activity, preferably before such activity occurs. The systems and methods described herein can also be used to optimize user privileges with respect to the application platforms, for example, to ensure that each user's privileges are consistent with normal or desired practice.

In many embodiments of the invention, a security monitoring and control system (e.g., the system 100 or a portion thereof) enables organizations to view user activities and interactions with the cloud services, as well as information about security controls in the various cloud services in use. In some embodiments, the security monitoring and control system analyzes information about user activity in one or more of the cloud services (and, in some cases, on premises applications as well) using machine learning and other algorithms to consolidate and normalize data to ensure activities are associated with the proper entity—whether that be a user, a file, an application, an organization, a role, or other item being tracked and measured. In some embodiments, the collected and analyzed data may be used to perform threat detection and to provide recommendations concerning appropriate responses to different categories of threats. The analytics can include determining models of normal and/or abnormal behavior in user activity and detecting patterns of suspicious activity in one cloud service or across multiple cloud services. Some patterns may involve detecting the same action or different actions in multiple cloud services that are associated with the same user account or IP address. Analytics may include providing an alert and recommending remedial measures in the cloud service(s) in which suspicious activity is detected and/or remedial measures to be taken in cloud services other than those showing suspicious activity.

The security monitoring and control system may include multiple components located on a single hardware platform or on multiple hardware platforms that communicate with each other. These components can include software applications and/or modules that configure a server or other computing device(s) to perform processes for cloud discovery and management as will be discussed further below. The cloud security monitoring and control system operates in conjunction with one or more client devices that can be used to access the cloud security system and cloud services. The client devices can include a number of different types of devices (e.g., desktop computers, tablets, mobile devices, automated web services, etc.), each communicating with the cloud services over a network.

The security monitoring and control system can retrieve data representing interactions between the client devices and the cloud services and store the information in an analytics repository. In some instances, the security monitoring and control system includes one or more application programming interfaces ("APIs") or, alternatively, uses APIs provided by the cloud service provider to access and retrieve the data. In many instances, the data entered into the repository is in different formats and/or can have different ranges of values, and data representing the same entity (e.g., a user, a file, etc.) may have different names, extensions, or other metadata associated with it, for example, depending on the cloud service provider from which the entity data was retrieved. As such, an entity resolution process can be used to consolidate and normalize the data such that activities associated with a single individual, file, or process can be viewed or aggregated as a common set, regardless of the naming convention used in the individual cloud-based application platforms.

The accounts of a particular user in different cloud applications (e.g., different user identities) can be consolidated using a common format and/or naming convention within the repository. The repository can store information concerning each organization's accounts and the individual user accounts associated with each organization. In some instances, a user associated with an organization may have user accounts with various cloud applications, and the organization may also have administrative accounts with the cloud applications that have management authority over its user's accounts. By associating user accounts to their proper organization accounts, the resulting data may be used in various ways, including retrieving information about the user activity of users associated with an organization. For example, an organization may use the "G SUITE" set of applications offered by GOOGLE for its productivity and collaboration toolset, and a user may be identified as "CKent." However, for other applications, such as file sharing applications (e.g., DROPBOX), the same user may be identified as ClarkK. Moreover, items such as email file attachments, individual files stored on cloud-based sharing repositories and locally stored files may be identified using different file names, but in fact be the same document. The entity resolution process described herein facilitates the consolidation and resolution of these seemingly different entities (e.g., users, files, etc.) such that activities emanating from those users or interactions with the items can be analyzed efficiently and accurately. In some cases, the resolution process includes two phases: a first phase in which multiple entities are resolved to a single entity (e.g., different user names, file names, services, etc. being resolved to a single entity) and a second phase in which the single entity is resolved against an application-agnostic dictionary such that each entity having a similar type (e.g., all users, all files, etc.) are identified using a common term.

For example, in the first phase, a user entity may have email addresses such as bob.jones@domain1.com and bjones@domain1.com. In this instance, the resolution process can be aware of different naming conventions, and can determine that these email addresses represent the same user in the service. This can also be applied in cases where email domains can vary, such as bob.jones@domain1.com and bob.jones@domain2.com, and the resolution system can determine, based on naming conventions, that these domains should be resolved into a single user. As a third example, resolution can occur based on an understanding that activity between two entities is a likely indicator that those entities represent the same user. For example, if bobjones@domain1.com has a strong link based on activity data to bob.jones@gmail.com, then the system can infer that these entities represent the same physical user. When the system determines two or more entities should be resolved to a single entity in an application, the two entity objects can be merged, after which both of the underlying entities can now point to the merged entity, allowing for an ability to reference or deference the merged or raw version of the entity.

Additionally or alternatively, in the second phase, the resolution process can view the merged entities of all applications, and perform a second pass where entities across multiple systems are resolved into a single entity representation for all systems. As an example, a user bob.jones@domain1.com in application 1 and a user bob.jones@domain1.com in application 2, can be merged into a single user with the email address bobjones@domain1.com. In addition, the example approaches that apply in the previous paragraph related to a single application view (e.g., based on user activity) can be applied in this cross-application resolution process.

A visual representation of this data may then be used to generate analytics for determining threat level, detecting specific threats, and predicting potential threats. For example, a graph having nodes and edges can be generated and analyzed, as described herein.

The consolidation of activity information in the repository concerning messaging, file access, application usage patterns and/or other event statistics enables the systems and methods described herein (e.g., the system 100) to establish baselines of expected and appropriate user behavior. Machine learning techniques can then be applied to detect threats and provide recommendations concerning how to respond to threats or unusual behavior. Threat models are developed and used to detect threats that are known or unknown or emerging. Threats can also be identified by comparing activity data with external threat intelligence information, such as information provided by third-party providers.

The common user information can also be utilized to facilitate user tracking and profiles across the multiple cloud applications. Collecting information about user behavior across multiple cloud services enables the system to, for example, initialize an alert (via an SMS message to a system administrator, for example) with respect to threats on certain cloud services and/or proactively secure cloud services on which a user maintains data by applying remedial measures, such as adding additional steps to authentication, changing passwords, blocking a particular IP address or addresses, blocking email messages or senders, and/or locking accounts. Such actions can ensure that any compromises of authentication credentials on one cloud service does not compromise authentication credentials or otherwise impact other cloud-based applications, or adversely impact the enterprise or organization as a whole.

To implement the entity resolution process, embodiments of the invention can identify two data types: activity data and state data. Activity data can be obtained from the cloud services via APIs and may include names such as events, audit, login, edit, send, receive, save, delete, etc. Activity data for an action or event may include a timestamp (e.g., when the activity was initiated) as well as information such as what action was being performed, who (or what service) was attempting to or doing the action (the "Actor"), and/or who or what was the target(s) of the action (the "Targets"). In some instances, additional context information for an activity may be captured and stored, such as an IP address, process status information (e.g., success/failure), client machine identification information, and/or effects of the activity on the target device, account or object. Based on this data, queries may be run to identify, for example, what activities have been executed (or attempted) in the past n days or hours, which resources have been promoting or been subject to higher or lower activity levels than normal, and whether any newly identified IP addresses or client devices have appeared and/or are evidencing suspicious behavior. To run a query on the activity data, the activity data can be processed and stored in one or more databases that expose and index one or more attributes of activity data. These databases can then be queried via a domain specific language that maps the domain specific language to underlying attributes of the activity data.

Because activity data is based on occurring events, activity data may not provide significant insights into entities that have not been promulgating activities through the network or have otherwise been inactive, such as users who are defined or have accounts but are inactive within a cloud service. This may be, for example, employees who have left an organization but may still be on group distribution lists, or individuals who have been removed from certain services but remain on others (e.g., removed from a source code repository but remain on email). To address the need to track unused profiles or entities, a set of all known entities can be compiled, and entities that are known to be inactive can be removed.

In various examples, state data can provide information about all the entities across a network or organization, such as users of the cloud service applications, installed applications, roles, policies, permissions, files, data packages, and other information that may not be identified by activity data. State data may, in some instances, include similar data such as a time stamp for the most recent activity that referenced or used an entity, but state data itself is generally not associated with a discrete event or activity. State data can provide information about intervals of time rather than information about the instant an activity occurred or the activity itself. State data for a user can represent or include, for example, user identifiers, user roles, user permissions, and/or user privileges for the cloud service applications. As users, applications, and other entities are added and removed and permissions and roles updated, state data may change to reflect such changes. While state data may be derived from activity data, doing so may require near-perfect parsing of activity data and activity logs that include a complete set of all state change events. More specifically, deriving state data from activity data can include or require identifying an event that correlates exactly to the change in state. This can also require not missing an event in the cloud service logs and/or the security monitoring and control system logs. Both the user and group logging the event may need to be identified as paired. Alternatively, state data may be collected at a less granular level (e.g., daily). Doing so may result in coarser activity resolution, but the likelihood that an event is missed can be significantly reduced, so the accuracy of the state information can be higher.

In some embodiments, the state data may include a primary field identifying the main entity(s) being collected, and a secondary field identifying related entities. For example, given a data set that includes all groups, the primary field can contain the name of the group entity, and the secondary field can contain a list of user entities that belong to that group.

In various implementations, the security monitoring and control system also includes entity extractor logic that can capture data from the cloud service applications and deposit the resulting data into a data store. Each cloud service application can include its own unique API and set of extractor logic, and a set structure including an input schema dictionary to define the data expected to be seen when using the API, thus validating the data retrieved using the API. Furthermore, the logic may include an event spec dictionary that declares which fields are to be extracted from the validated data, and how to translate the data into state instance data. An extract function can use the input schema and event spec dictionaries and return a list of extracted activities and extracted state objects. In some instances, subsequent methods convert the resulting lists to a more useful data exchange format, such as JavaScript Object Notation ("JSON"), and may further replace the contents of actor/target fields with an entity identifier (e.g., a user identifier or a document identifier) for that entity once uniquely defined.

In one implementation, entities are defined, in part, based on inherited values from an object class as specified in a base set of objects. For example, an object class "user" may be used to ascribe a definition to different user entities from a given service or application. Certain cloud service applications may already resolve users to a singular, user-principal-name ("UPN") field as a unique ID. For example, OFFICE365 provides a UPN field, and in such cases the extractor logic appends a set of metadata to the extracted field indicating as such (e.g., {unique_id": True}). Using the above techniques, data can be extracted from various cloud service providers and represented in an abstracted manner that facilitates cross-service analyses as described herein.

Once the entities are identified, they can be organized into a graph structure. In certain embodiments, the graph structure may be organized as a collection of nodes, where each node represents a user, and edges connecting the nodes represent activities among the users and/or other entities (e.g., files, documents, and/or data items). As an example of how activity can be represented by edges, consider an activity event in which a user reads a file. In this case, the nodes of the graph can represent the "actor" (the user who initiated the read) and the "target" file (the file that was read), and the edge of the graph can represent the "read" operation. The graph may be analyzed (e.g., manually or automatically) to identify a baseline set of activities for specific users (or classes of users), provide visibility and auditing capabilities across an entire organization, and identify various anomalies which may indicate malicious behavior emanating from within and/or directed at the organization through the various application services. For example, the graph can reveal interactions among entities (e.g., a user and a file) that should not be permitted to have any interactions.

In some instances, the graph can be analyzed manually via visual or textual exploration of the graph in its entirety, via exploration of subgraphs, exploration of individual nodes and/or edges in the graph, aggregations on top of the graph, or other interactive modalities. This manual analysis can be leveraged by a security analyst to verify decisions or provide explanations of decisions made by the system on behalf of the security analyst.

Additionally or alternatively, automated analysis of the graph, subgraphs, nodes, or edges can occur via a variety of algorithmic techniques. As an example, to find the communities or related notes in a graph, an automated system can apply one or more community detection algorithms on top of graph structures to identify communities (e.g., groups of users or other entities) in the graph. This community structure can then be used to find anomalous communities, or anomalous community membership in an automatic fashion. Such information can be provided to a security analyst for review and decision on what action should be taken.

In various embodiments of the invention, the security monitoring and control system uses techniques such as those discussed below to detect and/or address different threat scenarios. Specific use cases include account takeover attempts, insider threat scenarios, incident identification and response, attack surface area optimization or minimization, community detection, anomaly detection, and general visibility and auditing.

Figure 2:
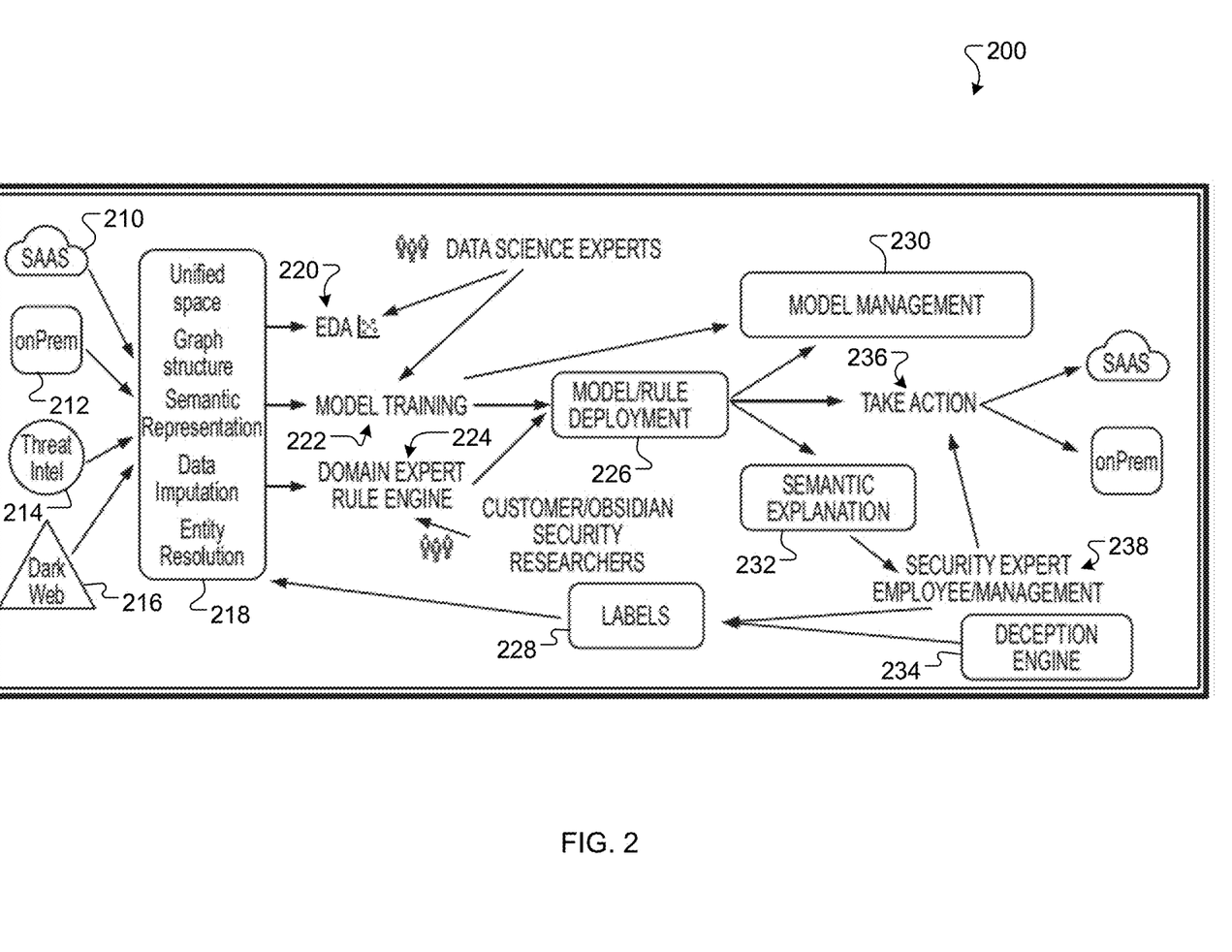
FIG. 2 is a schematic diagram of data flow and operational processes in an example system for identifying and managing security-related activities associated with a plurality of independent cloud-based, hosted application platforms.

FIG. 2 includes a schematic illustration of data flow and operational processes associated with an example system 200 for identifying and managing security-related activities, as described herein. A SaaS module 210 can query and retrieve data (e.g., activity data and/or state data) from a collection of available APIs provided by the different SaaS or cloud-based applications integrated with or accessed by the system 200. An OnPrem module 212 can collect data (e.g., activity data and/or state data) from various applications located on an internal network of an organization that uses the SaaS applications. Both the SaaS module 210 and OnPrem 212 module can send data related to the activity of entities in the system and/or the state of entities in the system, as described herein. A threat intel module 214 can retrieve data from a security-related source that can provide indicators of compromise and/or information regarding the risk of various attributes. For example, the threat intel module 214 can provide additional information related to an IP address, such as geolocation, previous security incidents associated with the IP address, or other security-related items. A dark web module 216 can provide a list of email accounts or addresses or other user identification elements, and can indicate whether or not the user has accounts for which passwords have been compromised or are available for purchase. A data processing module 218 can perform or utilize a series of data processing or transformation steps to join together the data from all incoming sources (e.g., from the SaaS module 210, the OnPrem module 212, the threat intel module 214, and/or the dark web module 216), normalize the data, and then store the processed data in a database or data warehouse for use by downstream applications. An EDA component 220 can allow a data or security analyst to query, visualize, and/or explore the output of the data transformation steps. A model training component 222 can include or utilize one or more processes that transform the data (e.g., from the data processing module 218) through various embeddings into a form suitable for consumption of or use in model training and prediction pipelines, as well as infrastructure and algorithms for training models on the underlying data. A domain expert rule engine 224 can include or utilize a series of processes that allow domain experts to create expert rules and heuristics against the underlying data. A model/rule deployment component 226 can be responsible for execution of the expert rules against the underlying data, for example, to find pieces of data that match one or more rules. Additionally or alternatively, the model/rule deployment component 226 can return predictions from the deployed models. A label component 228 can be responsible for tracking, storing, and/or organizing responses to rules and models for the system 200, for example, by security analysts, end users, or other parties. The resulting labels can then be used to measure an effectiveness of rules and models, and/or can provide labeled data sets for supervised machine learning models. A model management component 230 can be responsible for identifying and tracking the versioning and upgrading of models and rules in the system 200. A semantic explanation module 232 can be responsible for translating machine or non-domain expert data into simple, easy to understand natural language (e.g., for use by security experts or other system users). A deception engine 234 can be responsible for generating and deploying data into SaaS applications for the purpose of tracking or identifying resources that are accessing the data, to assist in identifying security incidents. A take action component 236 can be responsible for taking action to address identified security risks or incidents, such as, for example, responding to user requests to modify underlying SaaS applications, or automatically modifying underlying SaaS applications based on a probability that the action is justified. A security expert/employee management component 238 can provide an interface to both the security expert and the end user that can be used to provide additional information and responses to rules, models, and actions taken by the system 200.

As shown and described above, data can be observed and collected from various sources, including SaaS-based applications, on premises applications, known threat intelligence, and dark-web scans. The data can then be combined and normalized into a centralized data store, where a semantic representation (e.g., generalized dictionary) is used to implement an entity resolution process, as described herein. Once the data is resolved, a graph structure can be produced to assist with visualization and causal analysis. Additionally or alternatively, machine learning and/or modeling techniques can be applied to train models against the resolved data, and the models can be deployed into or used by the enterprise. In some instances, human intervention provides additional insights and expert analysis to further hone the models based on additional observations and organizational or global knowledge bases. The models may then be used to implement actions (e.g., account disablement, permission modifications, etc.), for example, by outputting commands or messages to system components. Various use cases are described in greater detail below.

In an account takeover attempt, the security monitoring and control system may identify brute force attack scenarios in which an attacker attempts many passwords in order to discover a correct password and compromise a user account. Specifically, these attempts may include instances where an incorrect entity (e.g., a hacker) is engaging in or attempting to engage in activities using credentials associated with a legitimate account owner. Detection may involve evaluating the velocity or frequency of failed login attempts and patterns in event activities to predict or detect a brute force attack. Moreover, brute force attacks may have different speeds, such as a slow attack or fast attack. Metrics for detection may include, for example, an unusually high number of login failures for existing valid accounts and/or an unusually high number of login attempts with invalid usernames. Using data gathered from previous known takeover attempts, or seeded data sets, various machine learning methods may be used to detect potential new threats and alert users and/or administrators to the possible threats. For example, data describing login attempts (e.g., including timestamp and login criteria, such as username and/or password) can be provided as input to a trained machine learning model, and the model can provide as output a predicted likelihood that one or more of the login attempts are associated with a takeover attempt.

The detection of potential insider threats includes, for example, identifying enterprise security breaches due to a disgruntled or recently terminated internal employee, a visitor performing tasks beyond their authorized functions, and/or employees performing unauthorized actions prior to remediating their access credentials to address the breach (e.g., IP address manipulation, etc.). As described above, a detection process may track a user's normal behavior to create a baseline activity profile and generate alerts when events or activities associated with the user's account(s) deviate from the baseline. For example, activities such as an unusually high use of corporate resources such as a high number of downloads, attempts to access accounts not attributed to the user, accessing/modifying/deleting code from a source code control system, or downloading, deleting, or modifying customer information/contracts. In some cases, machine learning techniques may be used to compare users' activities against activities of other users having the same or similar roles within the organization and identify users that deviate from the norm within the group. In some instances, the insider threat may take the form of application misuse, for example, where a user attempts to access data or perform operations that are beyond the user's defined role, and such misuse may be enterprise-wide or application-specific. In some instances, the collected data may be augmented with data collected from previous, known attacks (either from the same enterprise, or more generally available data), such as directory/file/resource enumeration, code repository breaches, and/or user account enumeration. Frequently seen attack profiles can then be coded into rules which provide a starting point for the modeling process. In some cases, rules can be cloned and revised to address different but similar attack variants. Additionally or alternatively, predictive models or algorithms can be configured to recognize activities that are outliers from normal behavior. Such deviations can be indicative of insider threats and can trigger an alert and/or cause the system to take action that addresses the threat. For example, the system can temporarily revoke or suspend the insider's access to one or more cloud services or online platforms.

In some examples, incident identification and response scenarios may be more activity-specific, in that an authenticated user operating within their defined role, and without any malicious intentions, may trigger an incident that is deemed to be a threat to the organization. For example, a user may access and download an infected file or inadvertently execute a malicious script. Based on a comparison with historical data collected from the source application, the user, and/or the file being accessed (if applicable), data for the current activity may indicate that the resulting effect is problematic (e.g., indicative of an insider threat). If so, actions taken in previous incidents (e.g., preventative or remedial actions) may be implemented as a defined incident workflow, specific to the observed activity.

In other instances, enterprises may use the collected data to define and optimize their "threat surface area" by provisioning permissions within each cloud service based on the usage patterns of the individual users and organizational guidelines, which can involve, for example, giving each user only the minimum set of permissions necessary to do the user's job, while having the smallest impact on user productivity. This process can ensure that all existing user accounts and roles are important or helpful and should exist for the benefit of the organization, and that the permissions associated with the accounts are in fact necessary. From this data, application-based usage profiles can be both stored and predicted using the historical data. These permissions may be stored and abstracted in a manner that is platform-agnostic, such that rules regarding account access and configuration can be consistent across multiple applications. In some embodiments, the platform-agnostic dictionary may include terminology describing additional platform attributes, such as roles (e.g., user or administrator), organizational entities (e.g., customer, company, etc.), functional entities (e.g., files, directories, messages, etc.) and activities (e.g., send, delete, process). As a result, any event or entity, and any function or process among or involving an entity or event can be mapped to a common term. For example, the dictionary can be used to map each user to a respective user identifier for each application platform, as described herein. This allows the system to compare events, entities, roles, functions, and/or processes for one cloud service directly with respective events, entities, roles, functions, and/or processes for one or more other cloud services, regardless of the terminology or syntax used by each cloud service to characterize or define these items.

Furthermore, maintaining a set of abstracted permissions can facilitate an easier transition from one service to another. For example, if an organization uses OFFICE365's mail application, the user permissions and account settings that have been created based on the extracted activity and state data can be easily applied if the organization changes to the GSUITE mail application. As an example of an abstracted permission model, in a first system or application, a user may be assigned a role, and each role may contain a collection of permissions that the user may engage in, for example, an ability to create new user accounts or delete files. In another application, a user may be assigned multiple different roles, each containing an overlapping set of permissions. In another application, a user may simply have no roles or permissions identified, and instead the permissions are inferred to be a minimal set of permissions a user can have in the application. To assess the permissions assigned to a user across all systems, different permissions models can be mapped to a joint model. In this example, a joint abstract model may allow for multiple roles with overlapping permissions, and all systems or applications can have models mapping into that system. For example, in the case of the application with no role assigned to the user, the user can be mapped to a model having a default role with default permissions.

In another use case, the systems and methods described herein can be used to identify user-driven malicious data exfiltration. For example, the systems and methods can identify or achieve, from underlying data, an enumeration of all the available outflow channels or mechanisms through which data can leave an infrastructure of a cloud application. Available outflow channels can be identified by monitoring, through activity information, activities that expose data to an entity or system outside the bounds of the application. For example, sharing a file publicly or emailing a user outside of the organization domain are methods of flowing data outside of a system. The systems and methods can access or identify all the data that is outflowing from one or more user-initiated channels. In general, a user-initiated outflow channel occurs when the user is responsible for authorizing and triggering the outflow event. For each outflow, data from the outflow channel can be processed to identify various data features, such as, for example: the user or system that initiated that data outflow; metadata about the piece of data (e.g., owner, title, name, time last modified, and/or time last accessed); the other users or entities that now have access to this data; activity of any external entities against the now outflowed piece of data; the length of time a piece of data is exposed via an outflow channel; historical data outflow status of a piece of data; and/or internal entities that have interacted with this piece of data. The systems and methods can collect labels that identify if the data sent over the outflow was appropriate and/or approved. The labels can be collected, for example, from the user that initiated the data outflow, the manager of the user that initiated the data outflow, and/or the security analyst responsible for the security of the organization. Data from the outflow (e.g., the data features) and associated labels can be used as training data (e.g., after being embedded into various formats) for one or more machine learning models. For example, unsupervised models can be constructed that identify anomalous activity associated with outflow channels. Additionally or alternatively, supervised classification models can be constructed that identify unwanted data exfiltration. The models can receive as input data features for an outflow and provide as output a predicted likelihood of whether the outflow is permissible or associated with malicious data exfiltration.

In another example, the systems and methods can be used to identify application-driven malicious data exfiltration. For example, the systems and methods can identify or achieve, from underlying data, an enumeration of all the available outflow channels or mechanisms through which data can leave an infrastructure of a cloud application via an integrated third party application. In general, an application-initiated outflow channel can occur when an application or system process authorizes and triggers an outflow event. Many systems can allow a user to authorize a third party application to access the system on behalf of the user. A user can initiate interaction with a third party application, which can prompt the user to authorize the application to access the target system on behalf of the user. Once authorized, the applications can be free to execute any action that the authorizing user can access or execute. As an example, a user may use GMAIL as their email provider and may then authorize a mail processing application to read or reply to emails on their behalf. In order for the mail processing application to execute this task, the user grants the application the ability to read and write the user's email from the underlying GMAIL system. In various instances, the systems and methods can access or identify all the data that is outflowing from one or more application-initiated channels. Data from an outflow channel can be processed to identify various data features, such as, for example: the application that initiated that data outflow; metadata about the piece of data (e.g., owner, title, name, time last modified, and/or time last accessed); the other users or entities that now have access to this data; activity of any external entities against the now outflowed piece of data; the length of time a piece of data is exposed via an outflow channel; historical data outflow status of a piece of data; and/or the internal entities that have interacted with this piece of data. These data features can be determined, for example, by direct collection of data from the underlying applications, aggregation of the underlying data from the applications, joining entities and activity between two different applications, and/or other available methods. The systems and methods described herein can measure or assess, based on metadata on the application and/or derived aggregation data from a global population of platform users, the following application features: a scope of permission associated with the application and a level of risk associated with the scope of permission; a prevalence of the application within the organization and globally across all organizations on the platform; and/or a domain and company that developed the application. The systems and methods can collect labels that identify (i) if the application that was integrated was appropriate and/or approved and (ii) if the data that was sent over the application data outflow channel was appropriate and/or approved. The labels can be collected, for example, from the user that authorized the application, the manager of the user that authorized the application, and/or the security analyst responsible for the security of the organization. The data features, application features, and/or labels can be used as training data (e.g., after being embedded into various formats) for one or more machine learning models. For example, unsupervised models can be constructed that identify anomalous activity associated with outflow channels. Additionally or alternatively, supervised classification models can be constructed that identify unwanted data exfiltration. The models can receive as input data features for an outflow and/or application features for an application and can provide as output a predicted likelihood of whether an application-driven outflow is permissible or associated with malicious data exfiltration.

In another use case, the systems and methods described herein can identify internal user reconnaissance activity. For example, the systems and methods can identify or achieve, from underlying data (e.g., activity data and/or state data), an enumeration of available methods of reconnaissance within a cloud application. In some instances, for example, underlying activity in the target applications can be collected and used to identify the following methods of reconnaissance: a request to read/download data items in the cloud application; a request and activity related to impersonation of other users or systems; and/or a request for or granting of additional permission scopes within the cloud application. In some examples, the systems and methods can search for and identify, in a cloud application, users who have (i) expanded permission scopes beyond their predicted baseline or peer group, (ii) expanded resource access beyond their predicted baseline or peer group, and/or (iii) access to sensitive resources beyond their predicted baseline or peer group. For example, one or more models can be developed and used predict baseline permissions for users and then compare actual permissions with the predicted baselines, to identify users who have unwarranted permissions and may be engaged in or have a greater risk of engaging in unauthorized or inappropriate reconnaissance activity. The systems and methods can collect labels that identify (i) if the current allocated permission scope for the user is appropriate and/or approved and/or (ii) if the requested permission and/or resource scope allocation for the user is appropriate and/or approved. The labels can be collected, for example, from the manager of the user and/or the security analyst responsible for the security of the organization. Such data and associated labels can be used as training data (e.g., after being embedded into various formats) for one or more machine learning models. For example, unsupervised models can be constructed that identify anomalous reconnaissance related activity. Additionally or alternatively, supervised classification models can be constructed that identify users who are engaging in or have potential to engage in internal reconnaissance. In some examples, the following features can be provided as input into models related to the classification of internal reconnaissance activity: activity related to reading and downloading of data in the system; activity related to denied attempts to read or download data in the system; activity related to increases or requests to increase permissions for accounts; requests and activity to impersonate or act on behalf of a user; applications connected by the user that engage in any of the above activity; quantified information related to risk computed by the system for a given user, based on a complete set of information available about the user; labels on activity that has been directly associated with internal reconnaissance activity; and/or other pieces of data that can help the models make an informed decision. The output of models trained on this data can be designed to classify a collection of activity for a given user as either internal reconnaissance or not, along with a measure of confidence that the activity is associated with the correct classification.

In another use case, the systems and methods described herein can quantify or assess risks associated with some or all users and entities of the cloud-based platforms. For example, the systems and methods can identify or achieve, from underlying data (e.g., activity data and/or state data), an enumeration of all the factors that can contribute to the risk a user poses to the organization using the cloud-based platforms. Such user risk factors can include, for example: a measure of the assigned permissions and resource access available to the user or entity; an identification of the third party applications integrated into the cloud applications by the user or entity; an identification of activity by the user or entity in the cloud application; an identification of the user or entity peer group; a measure of the extent of external entity interaction and/or data collaboration by or on behalf of the user or entity. The systems and methods can generate and collect security alerts associated with the users or entities. Labels can be collected (e.g., from the manager of the user and/or the security analyst responsible for the security of the organization) that identify if the risk associated items for the user or entity is appropriate and/or approved. A function (e.g., a regression equation or predictive model) can be constructed that quantifies the amount of risk associated with the user or entity across all cloud applications used by the organization. The function can use the user risk factors for each user (or entity) as input parameters and can provide as output a predicted overall risk assessment for the user (or entity). In some instances, for example, each user risk can factor can be associated with a weight that increases or decreases risk. The function or other model can combine the risk factors to generate a risk score for each user. The risk score can provide, for example, an indication of a likelihood that a user will engage (or has an ability to engage) in unauthorized or harmful activity with the cloud applications or data available therein. Users who have high risk scores can be flagged and appropriate action can be taken to prevent such users from engaging in harmful activity. Such action can include, for example, adjusting user permissions or user privileges associated with the cloud applications, in an effort to obtain a less risky combination of user risk factors.

In some instances, the systems and methods described herein can identify accounts that have been taken over by a third party. For example, underlying activity data can be segregated into sessions demarcated by an initial login or access sequence. Activity events can be identified that relate to an authentication chain between a user or entity and a cloud application. All post authentication activity between a user or entity and one or more cloud applications connected to the system can be identified, and various parameters associated with the authentication activity events can be extracted. Parameters that can be extracted and used include, for example, IP addresses, time of day, authentication method used, previous authentications, and/or other related information. The activity events and associated parameters can be enriched with third party data feeds by, for example: collecting geolocation information related to IP addresses attributed to authentication sequences; identifying domains associated with an IP address; classifying the IP address into one of a set of user populations (for example, university, government, café, airport, etc.); collecting scanning related activities attributed to the IP address; and/or collecting threat intelligence related information associated with the IP address, domain, or other information related to the IP address. Labels can be collected (e.g., from a user, a manager of the user, and/or the security analyst responsible for the security of the organization) that identify if the login sequence information and related telemetry is appropriate and/or approved. Such data (e.g., the enriched activity events and parameters) and associated labels can be used as training data (e.g., after being embedded into various formats) for one or more machine learning models. For example, unsupervised models can be constructed that receive as input activity events, associated parameters, and/or third party data feed enrichments and provide as output identifications of anomalous authentication sequences and/or anomalous post login activity. Additionally or alternatively, supervised classification models can be constructed that receive similar or identical input and are configured to classify a session of activity for a user as either a compromised session or a non-compromised session.

In some examples, the systems and methods described herein can be used to deploy preventative measures into cloud applications, for example, to reduce security risks or take corrective action after a security threat has been identified. A set of preventative controls can be identified that can be coordinated programmatically via an API for each cloud application integrated with the systems and methods described herein. For each cloud application, the set of preventative controls that can be coordinated via only direct human interaction is identified. Next, a mapping can be generated between (i) the set of available preventative controls for each application and (ii) a complete set of data collected by the system, a set of data transformations, queries, and/or models needed to determine optimal preventative controls that should be deployed into the cloud application. The preventative controls can then be deployed into the cloud application. An example of a preventative control that can be deployed into a cloud application is a conditional access policy that will block attempts to access a cloud application when the user is attempting to authenticate from an unauthorized location, as deemed by the conditional access policy. Based on automated analysis of the data, an optimal conditional access policy can be constructed and, via either an automated API method or manual entry through a cloud application user interface, deployed into the cloud application.

In some instances, the systems and methods described herein can be used to optimize an allocation of permissions assigned to entities in cloud applications. For each cloud application integrated with the systems and methods, for example, a set of permissions that are assigned to an entity can be identified. Data representing the activity associated with each entity in each cloud application can be collected. Next, a minimum set of permissions required to execute each represented activity is mapped to the activity. An algorithm is constructed that considers the set of permissions, activity, and mapping between activity and minimum permission sets to recommend an optimal permission that should be assigned to each entity in the cloud application. For example, given a set of activity over some time window for an entity in a cloud application, the constructed algorithm can identify for each activity the minimum permission needed to execute that activity. Then, given the full collection of minimum permissions needed to cover the activity for that window, the algorithm can identify the permissions associated with the entity that are not in the minimum permission set, and can recommend that those permissions be removed from the entity. For example, if an entity is granted the ability to create new user accounts, but over some specified time window has never created a new account, the algorithm can recommend that the permission to create new accounts be revoked from the user.

In certain use cases, the systems and methods described herein can achieve an automatic classification of the content contained in a collection of data. For each cloud application integrated with the systems and methods, one or more items of text based data (e.g., files, messages, email, etc.) can be identified, and text can be extracted from each item of data. The systems and methods can collect metadata pertaining to the entity that owns each item of data, the set of entities that have accessed or have access to the data, and any create, read, update, or other activity against the data. Associated text from the data can be embedded in various formats suitable for input into one or more algorithms responsible for modeling topics contained in a series of text files or documents. Metadata associated with each item of data can be embedded into various formats for input into one or more algorithms responsible for modeling the importance of an item of data. Importance of data can be based on a quantification of a combination of measures, including but not limited to: an organizational structure of the organization in relation to the owner of a piece of data as well as those entities that have read, updated, or otherwise interacted with the piece of data (e.g., data owned or accessed by upper management may be considered more important); a topic for the data belongs to a set of predefined topics that are considered sensitive (e.g., based on a security analyst's assessments), such as board meetings notes, business plans, customer information, etc.; and/or the presence of information in a document or other data that may violate compliance requirements around PII, HIPPA, or other compliance requirements related to data privacy. The sensitivity of each item of data can be classified, using the one or more algorithms, based on a topic and an importance of the item of data. A system is constructed that intercepts a sensitive piece of data (or provides or receives notifications) when the data has or is going to be shared outside the bounds of an organization. For example, the classification can be leveraged as input into a data interception or data notification system that prevents data sharing or notifies that data sharing is considered sensitive, based on the classification method and/or other related methods.

Figure 3:
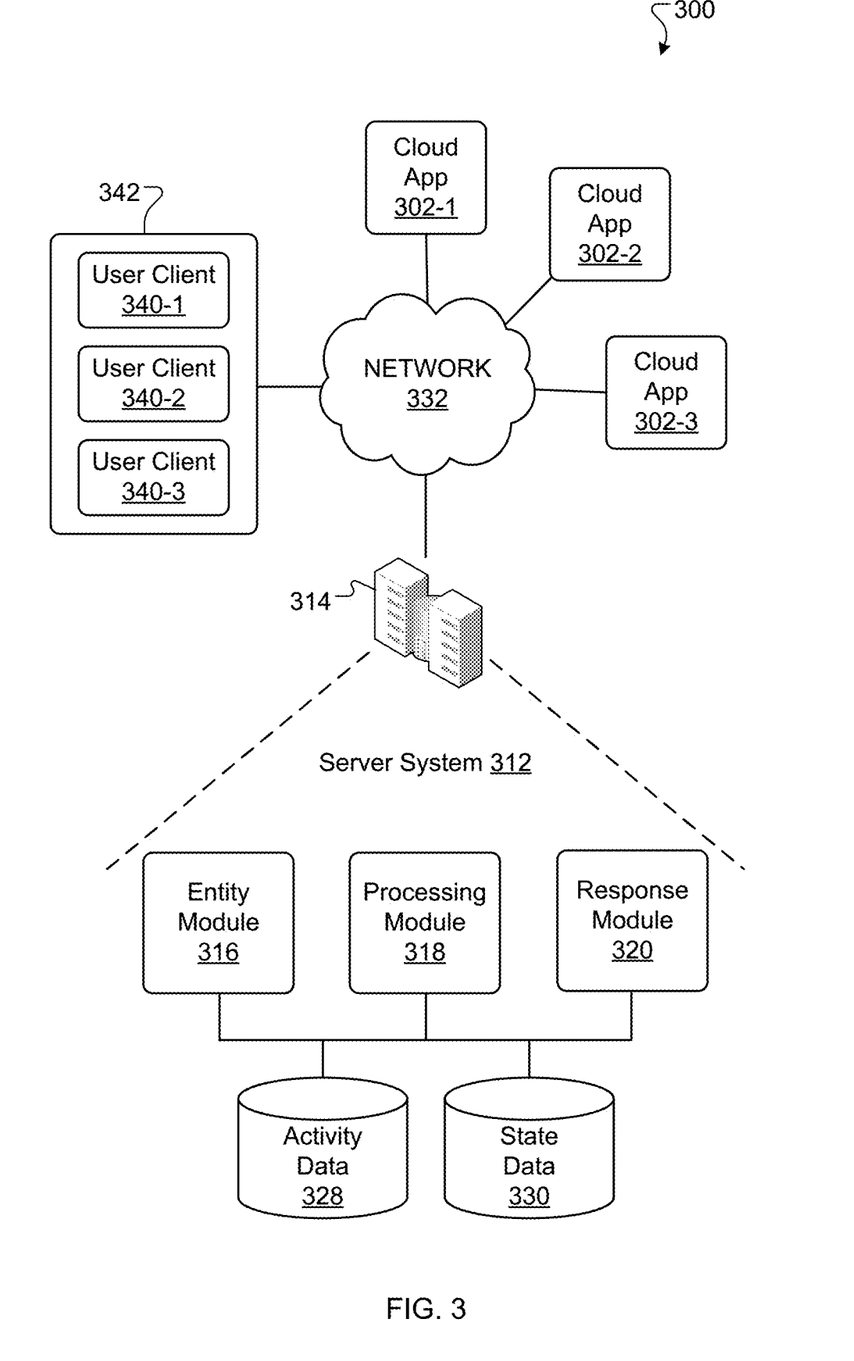
FIG. 3 is schematic diagram of an example system for identifying and managing security-related activities associated with a plurality of independent cloud-based, hosted application platforms.

FIG. 3 illustrates an example system 300 for detecting and managing security-related activities associated with a plurality of independent cloud-based, hosted application platforms 302-1, 302-2, 302-3 (collectively 302). A server system 312 provides functionality for collecting and processing data associated with user activities on the application platforms 302. The server system 312 includes software components and databases that can be deployed at one or more data centers 314 in one or more geographic locations, for example, or on a local network (e.g., of a company or other entity). The server system 312 software components can include an entity module 316, a processing module 318, and a response module 320. The software components can include subcomponents that can execute on the same or on different individual data processing apparatus. The server system 312 databases can include an activity data 328 database and a state data 330 database. The databases can reside in one or more physical storage systems.

In general, the application platforms 302 can be accessed through a network 332 (e.g., the Internet) by users of client devices 340-1, 340-2, 340-3 (collectively 340), such as smart phones, personal computers, tablet computers, and/or laptop computers. Other user client devices are possible. The users of the client devices 340 generally are members of or belong to an organization 342 that provides the users with access (e.g., via subscriptions) to the application platforms 302. For example, the organization can be a company (e.g., a corporation), an institution (e.g., a school, government entity, museum, etc.), or other entity, and the users can be employees, agents, contractors, consultants, students, and/or other members of the organization. In alternative examples, the activity data 328 database and the state data 330 database, or any portions thereof can be stored on one or more of the client devices 340. Additionally or alternatively, software components for the system 300 (e.g., the entity module 316, the processing module 318, and the response module 320) or any portions thereof can reside on or be used to perform operations on one or more of the client devices 340.

FIG. 3 depicts the entity module 316, the processing module 318, and the response module 320 as being able to communicate with the activity data 328 database and the state data 330 database. The activity data 328 database generally includes activity data associated with user activities on or with the application platforms 302, as described herein. The state data 330 database generally includes the state data (e.g., user privileges) associated with users of the organization 342, as described herein.

In general, the server system 312 can be, include, or form a portion of the "system" referred to herein and can perform the methods described herein. For example, the server system 312 can collect or obtain activity data and state data (e.g., from the application platforms 302) and can store such data in the respective activity data 328 and state data 330 databases. The entity module 316 can resolve the activity data and the state data to ensure that entities (e.g., users, documents, data items, etc.) are identified correctly across all application platforms 302. This can include mapping each entity to common terms or a respective term used for the entity by each application platform 302, as described herein. The processing module 318 can analyze the activity data and/or the state data (e.g., using one or more predictive models) to identify security-related risks associated with the application platforms, as described herein. The response module 320 can take corrective or remedial action or provide recommendations to address or alleviate existing or potential security-related risks, as described herein. While FIG. 3 depicts three application platforms 302, one organization 342, and three user client devices 340, it is understood that the system 300 can include any number of application platforms 302, organizations 342, and/or user client devices 340.

Figure 4:
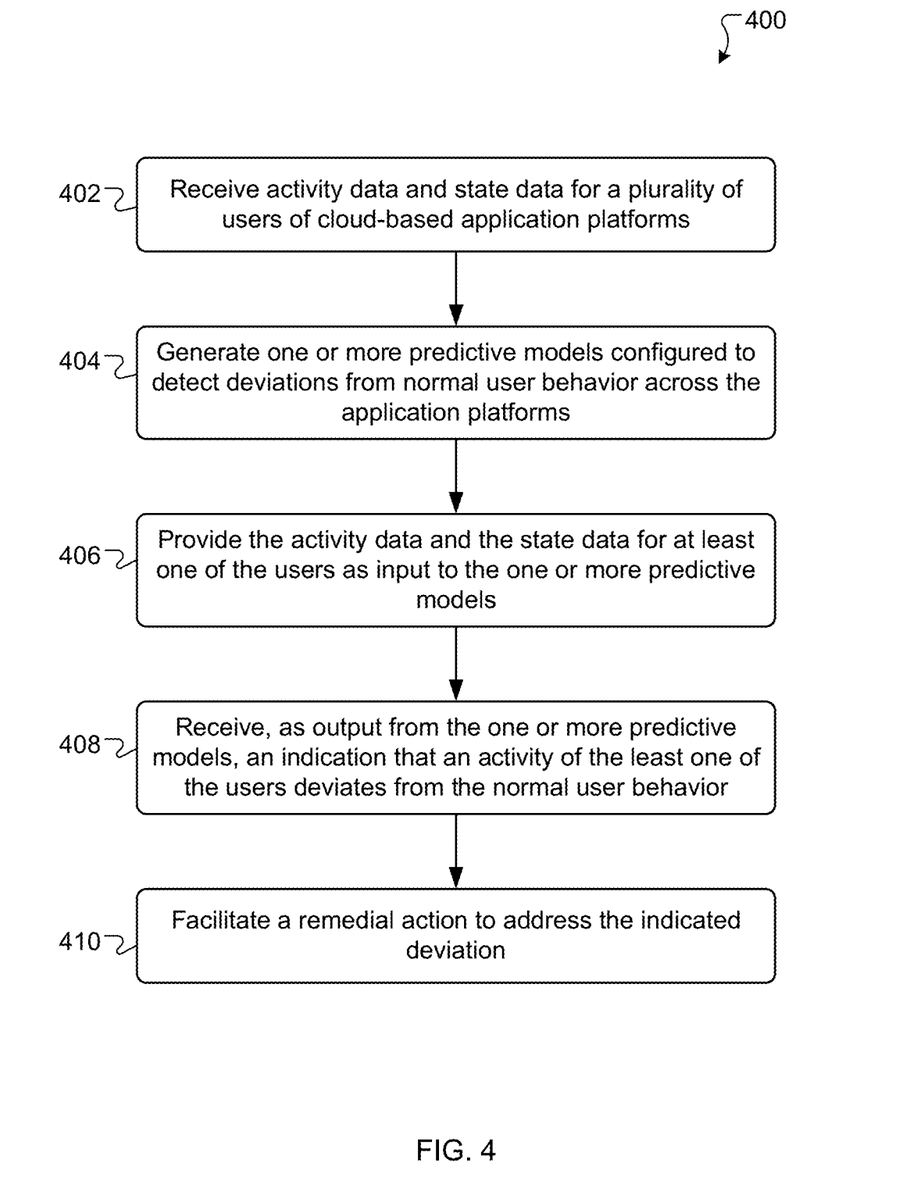
FIG. 4 is a flowchart of an example method of identifying and managing security-related activities associated with a plurality of independent cloud-based, hosted application platforms.

FIG. 4 is a flowchart of an example method 400 of detecting and managing security-related activities associated with a plurality of application platforms, such as independent cloud-based, hosted application platforms. Activity data and/or state data are received (step 402) for a plurality of users of the application platforms. The activity data is indicative of user activities within the application platforms, and the state data is indicative of a status or condition of the users within the application platforms. Based on the activity data and/or the state data, one or more predictive models are generated (step 404) and configured to detect deviations from normal user behavior (and/or deviations from normal user conditions or privileges) across the application platforms. The activity data and/or the state data for at least one of the users is provided (step 406) as input to the one or more predictive models. An indication that an activity of the least one of the users deviates from the normal user behavior is received (step 408) as output from the one or more predictive models. A remedial or corrective action is taken or facilitated (step 410) to address the indicated deviation.

In various examples, the predictive models described herein can be or include a trained classifier or a regression equation. For example, a predictive model can be or include a classifier such as, for example, one or more linear classifiers (e.g., Fisher's linear discriminant, logistic regression, Naive Bayes classifier, and/or perceptron), support vector machines (e.g., least squares support vector machines), quadratic classifiers, kernel estimation models (e.g., k-nearest neighbor), boosting (meta-algorithm) models, decision trees (e.g., random forests), neural networks, and/or learning vector quantization models. Other classifiers can be used.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 330 may be implemented in a distributed way over a network, such as a server farm or a set of widely distributed servers, or may be implemented in a single computing device.

Although an example processing system has been described in FIG. 3, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. A computer-implemented method, comprising:
   receiving, from a plurality of independent cloud-based, hosted application platforms, activity data and state data for a plurality of users of the application platforms, the activity data being indicative of user activities within the application platforms and the state data being indicative of a status of the users within the application platforms,
      wherein the independent cloud-based, hosted application platforms are provided by a plurality of service providers,
      wherein the service providers utilize a plurality of naming conventions in which a first file is associated with multiple file names and a first activity is associated with multiple activity names;
   performing an entity resolution process to map the first file to the multiple file names and the first activity to the multiple activity names,
      wherein the entity resolution process comprises a first phase in which multiple entities are resolved to a single entity and a second phase in which the single entity is resolved against an application-agnostic dictionary, such that entities having a similar type are identified using a common term;
   generating, based on the activity data and the state data, one or more predictive models configured to detect deviations from normal user behavior across the application platforms;
   providing, as input to the one or more predictive models, the activity data and the state data for at least one of the users;
   receiving, as output from the one or more predictive models, an indication that an activity of the at least one of the users deviates from the normal user behavior; and
   facilitating a remedial action to address the indicated deviation.

2. The method of claim 1, wherein the status of the users comprises at least one of a user role, a user permission, and a user privilege.

3. The method of claim 1, wherein generating one or more predictive models comprises:
   constructing a graphical representation of the activity data and the state data, wherein each node of the graphical representation represents a respective user of the application platforms and each edge connecting the nodes represents an activity among the users in the application platforms.

4. The method of claim 1, wherein the deviation from the normal user behavior comprises an abnormal number of login attempts and is indicative of account takeover.

5. The method of claim 1, wherein the deviation from the normal user behavior is indicative of anomalous reconnaissance activity.

6. The method of claim 1, wherein the deviation from the normal user behavior comprises behavior that is abnormal compared to behavior of other users who have similar roles within an organization that uses the application platforms.

7. The method of claim 1, further comprising receiving, as output from the one or more predictive models, an indication that a privilege of the at least one of the users to access the application platforms deviates from a desired privilege.

8. The method of claim 1, further comprising receiving, as output from the one or more predictive models, an indication that a data outflow from one of the application platforms is unauthorized.

9. The method of claim 1, further comprising receiving, as output from the one or more predictive models, a risk score for each user from the plurality of users, wherein the risk score comprises an indication of a likelihood that the user will engage in unauthorized activity using the application platforms.

10. The method of claim 1, further comprising receiving, as output from the one or more predictive models, an indication that a user is attempting to transmit a sensitive item of data to a computer outside of an organization using the application platforms.

11. The method of claim 1, further comprising mapping each user from the plurality of users to a respective user identifier for each application platform.

12. A system, comprising:
one or more hardware computer processors programmed to perform operations comprising:
receiving, from a plurality of independent cloud-based, hosted application platforms, activity data and state data for a plurality of users of the application platforms, the activity data being indicative of user activities within the application platforms and the state data being indicative of a status of the users within the application platforms,
wherein the independent cloud-based, hosted application platforms are provided by a plurality of service providers,
wherein the service providers utilize a plurality of naming conventions in which a first file is associated with multiple file names and a first activity is associated with multiple activity names;
performing an entity resolution process to map the first file to the multiple file names and the first activity to the multiple activity names,
wherein the entity resolution process comprises a first phase in which multiple entities are resolved to a single entity and a second phase in which the single entity is resolved against an application-agnostic dictionary, such that entities having a similar type are identified using a common term;
generating, based on the activity data and the state data, one or more predictive models configured to detect deviations from normal user behavior across the application platforms;
providing, as input to the one or more predictive models, the activity data and the state data for at least one of the users;
receiving, as output from the one or more predictive models, an indication that an activity of the at least one of the users deviates from the normal user behavior; and
facilitating a remedial action to address the indicated deviation.

13. The system of claim 12, wherein the status of the users comprises at least one of a user role, a user permission, and a user privilege.

14. The system of claim 12, wherein generating one or more predictive models comprises:
constructing a graphical representation of the activity data and the state data, wherein each node of the graphical representation represents a respective user of the application platforms and each edge connecting the nodes represents an activity among the users in the application platforms.

15. The system of claim 12, wherein the deviation from the normal user behavior comprises an abnormal number of login attempts and is indicative of account takeover.

16. The system of claim 12, wherein the deviation from the normal user behavior is indicative of anomalous reconnaissance activity.

17. The system of claim 12, wherein the deviation from the normal user behavior comprises behavior that is abnormal compared to behavior of other users who have similar roles within an organization that uses the application platforms.

18. The system of claim 12, the operations further comprising receiving, as output from the one or more predictive models, an indication that a privilege of the at least one of the users to access the application platforms deviates from a desired privilege.

19. The system of claim 12, the operations further comprising receiving, as output from the one or more predictive models, an indication that a data outflow from one of the application platforms is unauthorized.

20. The system of claim 12, the operations further comprising receiving, as output from the one or more predictive models, a risk score for each user from the plurality of users, wherein the risk score comprises an indication of a likelihood that the user will engage in unauthorized activity using the application platforms.

21. The system of claim 12, the operations further comprising receiving, as output from the one or more predictive models, an indication that a user is attempting to transmit a sensitive item of data to a computer outside of an organization using the application platforms.

22. The system of claim 12, the operations further comprising mapping each user from the plurality of users to a respective user identifier for each application platform.

23. An article, comprising:
a non-transitory computer-readable medium having instructions stored thereon that, when executed by one or more computer processors, cause the one or more computer processors to perform operations comprising:
receiving, from a plurality of independent cloud-based, hosted application platforms, activity data and state data for a plurality of users of the application platforms, the activity data being indicative of user activities within the application platforms and the state data being indicative of a status of the users within the application platforms,
wherein the independent cloud-based, hosted application platforms are provided by a plurality of service providers,
wherein the service providers utilize a plurality of naming conventions in which a first file is associated with multiple file names and a first activity is associated with multiple activity names;
performing an entity resolution process to map the first file to the multiple file names and the first activity to the multiple activity names,
wherein the entity resolution process comprises a first phase in which multiple entities are resolved to a single entity and a second phase in which the single entity is resolved against an application-agnostic dictionary, such that entities having a similar type are identified using a common term;

generating, based on the activity data and the state data, one or more predictive models configured to detect deviations from normal user behavior across the application platforms;

providing, as input to the one or more predictive models, the activity data and the state data for at least one of the users;

receiving, as output from the one or more predictive models, an indication that an activity of the at least one of the users deviates from the normal user behavior; and facilitating a remedial action to address the indicated deviation.

\* \* \* \* \*